J. R. WERNER.
Photographic Camera.
No. 18,218.
Patented Sept. 15, 1857.
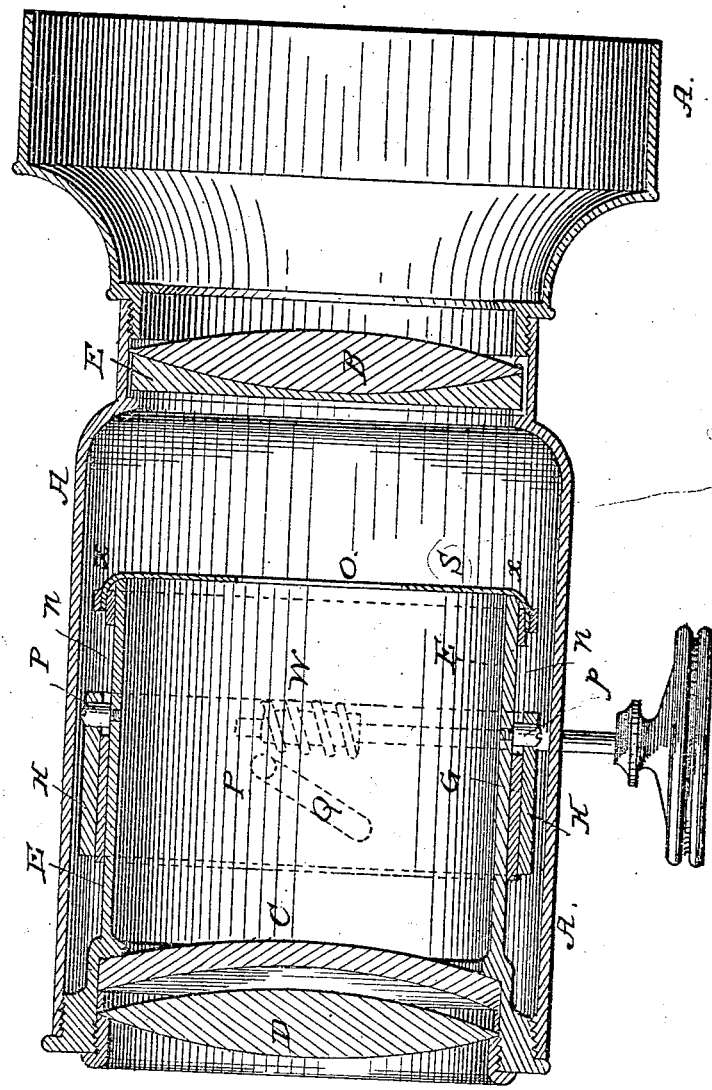

UNITED STATES PATENT OFFICE.

J. ROBERT WERNER, OF NEW YORK, N. Y.

DIAPHRAGM FOR PHOTOGRAPHIC CAMERAS.

Specification of Letters Patent No. 18,218, dated September 15, 1857.

*To all whom it may concern:*

Be it known that I, J. ROBERT WERNER, of New York, in the county and State of New York, have made certain Improvements in Photographic Cameras; and I do hereby declare that the following is a full and exact description thereof, reference being had to the accompanying drawings and to the letters of reference marked thereon.

The nature of my invention consists in a concentrically expanding diaphragm, situated near the mathematical point, between the front and back lens, in the camera tube, and capable of being operated, so as to enlarge or contract the opening, to regulate the admission of light into the camera.

In the accompanying drawing A represents the camera tube into which the glasses or lenses, I, B, C, D are fixed in the usual manner.

E is a tube provided on the inside and firmly attached, and of such a length as to bring the end of said tube in a line with the mathematical point of the lenses.

G, is a tube, capable of sliding easily over the outside of the tube E, and provided with two slots, n, n, in which the projections p, p, fast to the tube E, slide, to guide the motion of said tube G. On the end of this tube G and passing over the end of the tube E, an elastic diaphragm, S, is stretched and secured to the tube G through the ring x. This diaphragm has a circular opening O in the center.

H is a ring turning around the tube G, on the outside of which teeth are cut into which the worm wheel W works. This ring is provided with slots in which the projections, p, p, slide, by which arrangement only a circular motion is allowed to said ring H, due from the action of the worm wheel W into the teeth on the outside of said ring H, and by which any motion arising from friction of the tube G, while passing in or out is counteracted.

P, is a pin attached to the tube G, and working in a diagonal slot, Q, in the ring H, whereby the circular motion of said ring H produces a longitudinal motion upon the tube G.

Instead of the above described mechanism for producing a longitudinal motion on the tube G, and by which the elastic diaphragm will be stretched or allowed to relax, any other suitable arrangement may be used.

When the wormwheel, W, is turned the ring H will be turned around, acting upon the pin P in such a manner as to produce a longitudinal motion upon the tube G, on account of the projections, p, p, guiding the same, and by which longitudinal motion, the elastic diaphragm S will either be stretched tight over the end of the tube E and thereby increasing concentrically the opening, O, in said diaphragm, or said diaphragm will be allowed to relax, when on account of its elasticity the opening, O. will be diminished and return to its original size.

In camera tubes for the purpose of taking portraits the diaphragm is situated between the lenses as above described and as represented in the drawings, while in camera tubes for landscapes where the lenses I and B are dispensed with said diaphragm will consequently be before the glasses or lenses. This diaphragm S fulfils in the camera the same purpose as the iris in the human eye. As the pupil is enlarged or diminished by means of the iris, when more or less light is required, for the purpose of obtaining a clear view of the object before us, in the same manner this will be obtained in the camera, by the application of this diaphragm, and consequently a sharper and more distinct picture will thereby be obtained, as the opening, O, of the diaphragm and consequently the quantity of light, can always be regulated, to be in exact proportion to the intensity of the light.

What I claim as my invention and desire to secure by Letters Patent is—

The application of an elastic diaphragm in photographic cameras for the purpose and in the manner specified.

J. ROBERT WERNER.

Witnesses:
HENRY E. ROEDER,
GEORGE W. MUNSON.